United States Patent Office
3,796,683
Patented Mar. 12, 1974

1

3,796,683

VULCANIZATION OF NATURAL AND SYNTHETIC RUBBERS FROM HALOGEN FREE DIENES

Werner Schwarze, Frankfurt, Herman Westlinning, Kleinostheim, Siegfried Wolff, Bruhl, and Horst Fleischhauer, Grossauheim, Germany, assignors to Deutsche Gold- und Silber-Scheideanstalt vormals Roessler, Frankfurt am Main, Germany No Drawing. Filed July 7, 1972, Ser. No. 269,865
Claims priority, application Germany, July 9, 1971, P 21 34 214.3
Int. Cl. C08c *11/10, 11/18, 11/60*
U.S. Cl. 260—42.33 10 Claims

ABSTRACT OF THE DISCLOSURE

Natural and synthetic rubbers from halogen free dienes are vulcanized in the presence of sulfur and/or sulfur donors and a vulcanization accelerator of the formula

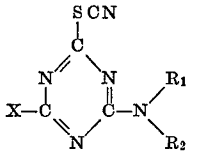

where $R_1$ and $R_2$ are hydrogen, alkyl, hydroxyalkyl, aralkyl, cycloalkyl, phenyl, alkyl phenyl or heterocyclic and X is —SCN or

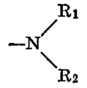

The present invention is directed to a process for the vulcanization of halogen free diene rubbers or mixtures of such rubbers using a new vulcanization accelerator and to the novel accelerators themselves.

It is known to use mercaptobenzothiazole (MBT) for the vulcanization of diene rubbers in the presence of sulfur. This vulcanization accelerator, however, has the great disadvantage that the vulcanization occurs too quickly and therefore the processing safety of the crude mixture is very small. This is highly significant in the molding of rubber articles in industry.

It is further known that the processing safety can be increased by converting the mercaptobenzothiazole into a disulfide (MBTS) or into a sulfenamide, for example benzothiazyl-2-cyclohexylsulfenamide (CBS). The processing safety, however, of the disulfide is only immaterially greater than with mercaptobenzothiazole. The use of the sulfenamide, however, is tied to a severe disadvantage. The amine becomes free in the vulcanization and injures certain types of fabrics especially polyester fabrics which are used to a great extent as tire cords and as a result the importance of the sulfenamides as vulcanization accelerators has declined (B. S. Garvey, Jr., Rubber Age, December 1970, pp. 40–41).

It has now been found that natural rubber and synthetic rubber from halogen free dienes or mixtures of these rubbers can be vulcanized in the presence of sulfur and/or sulfur donors and sulfur containing s-triazine derivatives by the use of heat and in a given case pressure if there is used as the vulcanization accelerator one or more s-triazine derivatives of the formula (I)

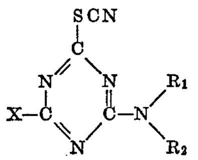

2

$R_1$ and $R_2$ are the same or different and can be hydrogen, alkyl of 1 to 18 carbon atoms, alkyl of 1 to 18 carbon atoms having one or more, preferably up to 3, non adjacent OH groups, aralkyl of 6 carbon atoms in the ring and 1 to 6 carbon atoms in the alkyl group, cycloalkyl having 5 to 7 carbon atoms in the ring and 0 to 3 alkyl side chains with each 1 to 6 carbon atoms, phenyl substituted with 0 to 3 alkyl groups each having 1 to 6 carbon atoms, and wherein $R_1$, $R_2$ and the nitrogen altogether form a heterocyclic ring having 5 to 7 ring atoms with 3 to 6 carbon atoms and 0 to 1 oxygen atom, and X is —SCN or

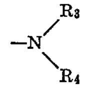

wherein $R_3$ and $R_4$ have the same meaning as $R_1$ and $R_2$.

Conventional vulcanization temperatures and pressures can be used.

The new vulcanization accelerators can be added advantageously in an amount of 0.1 to 5 parts by weight per 100 parts of the rubber. They can be classified simply as mono and bis-thiocyanato triazines.

In processing safety these accelerators exceed MBT and also MBTS, in many cases they also exceed CBS. The new accelerators can be designated chemically as thiocyanate derivatives of s-triazine.

Moreover, the vulcanization is carried out under customary conditions; the required heat can be produced by any desired manner including electromagnetic oscillation, for example high and ultra high frequency fields. There can also be added to the vulcanizable composition the customary further additives in the known amounts. To these belong in addition to sulfur or the sulfur donors, especially rubber chemicals such as zinc oxide, stearic acid, etc., processing aids as for example plasticizers, antiagers, lubricants, etc.

As sulfur donors there are noted particularly N,N'-dithiobismorpholine, dipentamethylene - thiuramtetrasulfide, N,N'-dithio-bis-hexahydro-2H-azepinone-2 and 2-benzthiazyldithio-N-morpholide although as stated any conventional sulfur donor can be used.

As examples of rubbers suitable for use in the invention there can be preferably used natural rubber (NR), homo and copolymers of conjugated dienes, butadiene-styrene rubber (SBR), nitrile rubber, i.e., butadiene acrylonitrile (NBR), polybutadiene (BR) and polyisoprene (IR). Further butadiene copolymers which may be used in the invention are such as butadiene-acrylic acid ester copolymers, e.g. butadiene-2-ethylhexyl acrylate copolymer, butadiene-methyl methacrylate copolymer, butadiene-vinylpyridine copolymer, butadiene-alkyl-vinyl-pyridine copolymer, e.g. butadiene-2-vinyl-5-methylpyridine copolymer, furthermore ethylene-propylene terpolymers e.g. ethylene-propylene-dicyclopentadiene terpolymer, ethylene-propylene-norbornadiene terpolymer, ethylene-propylene-cyclooctadiene terpolymer and ethylene-propylene-cyclododecatriene terpolymers and butyl rubber (isobutylene-butadiene copolymer).

As fillers all kinds of blacks can be used which are added in rubber technology, as well as silica which has been obtained by aqueous precipitation, pyrogenically produced silica and arc silica, furthermore silicates, e.g. calcium silicate, as well as in a given case alumina, carbonates, e.g. calcium carbonate, chalk, kaolin and other clays and kieselguhr. The fillers are used in their customary proportions, e.g. 10 to about 200 parts per 100 parts of rubber.

Unless otherwise indicated all parts and percentages are by weight.

The production of the thiocyanato triazines takes place according to conventional methods. In the case of the production of bis-thiocyanate-s-triazines the starting material can be the corresponding chlorotriazine which is reacted with, for example, potassium, sodium or ammonium thiocyanate in an organic solvent, preferably in acetone. The corresponding substituted dimercaptotriazines can also be used as starting materials to react with cyanogen chloride or cyanogen bromide in the presence of a hydrogen halide acceptor. The reaction is preferably carried out in water.

The monothiocyanato-s-triazines are always prepared from the corresponding monomercaptotriazines by reaction with cyanogen chloride or cyanogen bromide in the presence of a hydrogen halide acceptor, again preferably in water.

The new vulcanization accelerators in general are white to light yellow crystalline materials which are soluble in almost all organic solvents.

Illustrative of compounds within the present invention and suitable as vulcanization accelerators are compounds with the general formula (II)

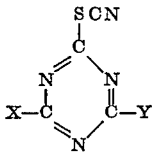

In which the ligands X and Y are as indicated in the following table of -s-triazine compounds:

TABLE

[Examples of suitable mono and bis thiocyanato s-triazines]

| Substituents X | Substituents Y | Melting point, ° C. | Appearance |
|---|---|---|---|
| i-$C_3H_7$MH— | i-$C_3H_7$NH— | 65 | White crystals. |
| $C_4H_9$NH— | $C_4H_9$NH— | 78 | Do. |
| $C_2H_5$NH— | i-$C_3H_7$NH— | 81 | Do. |
| $C_2H_5$NH— | n-$C_4H_9$NH— | 71–73 | Do. |
| $CH_3$NH— | $(C_2H_5)_2$N— | 50–51 | Do. |
| $CH_3$NH— | $C_2H_5$NH— | 82–83 | Do. |
| $CH_3$NH— | $(CH_3)_2$N— | 159–160 | Do. |
| $CH_3$NH— | i-$C_4H_9$NH— | 68–69 | Do. |
| $CH_3$NH— | t-$C_4H_9$NH— | 93 | Do. |
| $C_2H_5$NH— | $(CH_3)_2$N— | 125–126 | Do. |
| $CH_3$NH— | i-$C_3H_7$NH— | 73 | Do. |
| —$NH_2$ | $(C_2H_5)_2$N— | 106–108 | Do. |
| —$NH_2$ | t-$C_4H_9$NH— | 135 | Do. |
| $C_2H_5$NH— | $(C_2H_5)_2$N— | 87.5–88.5 | Do. |
| $C_6H_5$NH— | SCN | 157–159 | Do. |
| t-$C_4H_9$NH— | SCN | 120–122 | Do. |
| i-$C_3H_7$NH— | SCN | 143–145 | Do. |
| $(C_2H_5)_2$N— | SCN | 115–118 | Do. |
| —$N(CH_2CH_2OH)_2$ | SCN | 136–137 | Do. |
| $C_6H_{11}$NH— | SCN | 165–166 | Light yellow crystals. |
| $C_{18}H_{37}$NH— | SCN | 95–98 | White crystals. |

Other compounds within the invention include 2,4-diamino-6-thiocyanato-s-triazine,
2-methylamino-4-octadecylamino-6-thiocyanato-s-triazine,
2-benzylamino-4-diethylamino-6-thiocyanato-s-triazine,
2-phenethyl-amino-4-hexylamino-6-thiocyanato-s-triazine,
2-cyclohexylamino-4-dipropylamino-6-thicyanato-s-triazine,
2,2′-methylcyclohexylamino-4-octylamino-6-thiocyanato-s-triazine,
2-cyclopentyl-amino-4-n-butylamino-6-thiocyanato-s-triazine,
2-amino-4-cycloheptylamino-6-thiocyanato-s-triazine,
2-amino-4,3′-hexylcyclohexyl-amino-6-thiocyanato-s-triazine,
2,2′,4′,6′-trimethylcyclohexyl-4-diethylamino-6-thiocyanato-s-triazine,
2-phenylamino-4-phenylamino-6-thiocyanato-s-triazine,
2-diphenylamino-4-methylamino-6-thiocyanato-s-triazine,
2-o-tolylamino-4-t-butylamino-6-thiocyanato-s-triazine, 2,2′,4′-dimethylphenylamino-4-amino-6-thiocyanato-s-triazine,
2-hexylamino-4-di sec. butylamino-6-thiocyanato-s-triazine,
2-diphenylamino-4,6-bis-thiocyanato-s-triazine,
2-benzylamino-4,6-bis-thiocyanato-s-triazine,
2-hexylamino-4,6-bis-thiocyanato-s-triazine,
2-dicyclohexylamino-4,6-bis-thiocyanato-s-triazine,
2-bis(2′-hydroxyethyl)amino-4-dipropylamino-6-thiocyanato-s-triazine,
2,2′-hydroxypropylamino-4-amino-6-thiocyanato-s-triazine,
2-bis(3′-hydroxypropylamino)-4-methylamino-6-thiocyanato-s-triazine.

Additional objects of the invention as previously stated are the development of compounds of Formula I or mixtures of these compounds as vulcanization accelerators or the preparation of vulcanizable mixtures of these with one or more natural or synthetic rubbers from halogen free dienes. The vulcanizable mixture can include sulfur and/or sulfur donors. The sulfur can be used in an amount of 0.2 to about 4 parts by weight per 100 parts by weight of the rubber. The sulfur donors can be used in addition to or in place of the sulfur in an equivalent amount.

The vulcanization of the rubber is generally carried out between about 100° C. and about 300° C., preferably at 140 to 240° C. employing any of apparatus conventional in the art, for example, hot steam, hot air, salt bath, fluidized bed, steam tube, by hot pressing, and ultra high frequency, etc.

The vulcanizates prepared according to the invention are useful in the production of vehicle tires and industrial articles such as, for example, hoses, gaskets, conveyor belts, footwear or parts thereof and others.

The following Examples 1–7 were carried out with monothiocyanato triazines.

EXAMPLE 1

| | Test recipes and results | | | | |
|---|---|---|---|---|---|
| | 1 | 2 | 3 | 4 | 5 |
| Composition: | | | | | |
| Natural rubber (ribbed smoked sheets I) | 100 | 100 | 100 | 100 | 100 |
| Carbon black N 330 (Corax 3 of Degussa) | 50 | 50 | 50 | 50 | 50 |
| Stearic acid | 2 | 2 | 2 | 2 | 2 |
| Zinc oxide | 3 | 3 | 3 | 3 | 3 |
| MBT | 0.5 | | | | |
| MBTS | | 0.5 | | | |
| CBS | | | 0.5 | | |
| 2-ethylamino-4-diethylamino-6-thiocyanato-s-triazine | | | | 0.5 | |
| 2-amino-4-diethylamino-6-thiocyanato-s-triazine | | | | | 0.5 |
| Sulfur | 2.5 | 2.5 | 2.5 | 2.5 | 2.5 |
| Scorch time $t_5$ in minutes (according to DIN 53524) at 120° C. | 14 | 18 | 25 | 42 | 42 |
| Modulus 300% in kg./cm.$^2$ (according to DIN 53504) | 122 | 123 | 160 | 148 | 158 |
| Heat generation (measured with the Goodrich-Flexometer according to ASTM D 623-67, method A): | | | | | |
| ΔT in ° C. (measured at room temperature) | 81 | 86 | 61 | (1) | 69 |
| Compression set (measured at room temperature) in percent | 16 | 19 | 6 | (1) | 6 |
| Vulcanization time at 150° C. in minutes | 20 | 20 | 20 | 60 | 40 |

1 Not measured.

Both of the monothiocyanato-thiazines showed substantially longer scorch times than the accelerators MBT and MBS. Even the CBS was exceeded considerably. On the other hand with the triazine compounds higher yields of cross linking were produced than with MBT and MBTS, measured by the modulus at 300% elongation. The modulus values attainable with CBS were likewise produced with 2-amino-4-diethyl-amino-6-thiocyanato-s-triazine. Similar to CBS there was the special advantage in regard to the heat generation and the compression set after the test.

EXAMPLE 2

| | Test recipes and results | | | |
|---|---|---|---|---|
| | 1 | 2 | 3 | 4 |
| Composition: | | | | |
| Polyisoprene rubber (Ameripol SN 360) | 100 | 100 | 100 | 100 |
| Carbon black N 330 (Corax 3 of Degussa) | 50 | 50 | 50 | 50 |
| Stearic acid | 2 | 2 | 2 | 2 |
| Zinc oxide | 3 | 3 | 3 | 3 |
| MBT | 0.6 | | | |
| MBTS | | 0.6 | | |
| CBS | | | 0.6 | |
| 2-amino-4-diethylamino-6-thiocyanato-s-triazine | | | | 0.6 |
| Sulfur | 2.5 | 2.5 | 2.5 | 2.5 |
| Scorch time $t_5$ in minutes (according to DIN 53524) at 130° C | 11 | 15 | 20 | 27 |
| Modulus 300% in kg./cm.$^2$ (according to DIN 53504) | 94 | 97 | 139 | 174 |
| Heat generation (measured with the Goodrich-Flexo-meter according to ASTM D 62367, method A): | | | | |
| ΔT in ° C. (measured at room temperature) | 81 | 78 | 60 | 59 |
| Compression set (measured at room temperature) in percent | 10 | 11 | 6 | 3 |
| Vulcanization time at 150° C. in minutes | 60 | 40 | 20 | 60 |

In polyisoprene rubber the 2-amino-4-diethylamino-6-thiocyanato-s-triazine showed itself to be especially advantageous since in contrast to MBT, MBTS and CBS it not only produces long scorch times but also resulted in substantially higher cross-linking yields or high modulus values. Further especial advantages include slight heat generation and permanent deformation.

EXAMPLE 3

| | Test recipes and results | | | |
|---|---|---|---|---|
| | 1 | 2 | 3 | 4 |
| Composition: | | | | |
| Styrene-butadiene rubber (Buna Huls 1500) | 100 | 100 | 100 | 100 |
| Carbon black N 330 (Corax 3 of Degussa) | 50 | 50 | 50 | 50 |
| Stearic acid | 2 | 2 | 2 | 2 |
| Zinc oxide | 3 | 3 | 3 | 3 |
| MBT | 1.0 | | | |
| MBTS | | 1.0 | | |
| 2-ethylamino-4-diethylamino-6-thiocyanato-s-triazine | | | 1.0 | |
| 2-amino-4-diethylamino-6-thiocyanato-s-triazine | | | | 1.0 |
| Sulfur | 2 | 2 | 2 | 3 |
| Scorch time $t_5$ in minutes (according to DIN 53524) at 130° C | 14 | 18 | 22 | 25 |
| Modulus 300% in kg./cm.$^2$ (according to DIN 53504) | 167 | 173 | 165 | 180 |
| Vulcanization time at 160° C. in minutes | 100 | 100 | 100 | 100 |

Also in styrene-butadiene rubber there is clear proof of the gain in processing safety combined with good cross linking yields in comparison to MBT and MBTS.

EXAMPLE 4

| | Test recipes and results | | |
|---|---|---|---|
| | 1 | 2 | 3 |
| Composition: | | | |
| Polybutadiene rubber (Buna CB 10) | 100 | 100 | 100 |
| Carbon black N 330 (Corax 3 of Degussa) | 50 | 50 | 50 |
| Stearic acid | 2 | 2 | 2 |
| Zinc oxide | 3 | 3 | 3 |
| MBT | 0.9 | | |
| MBTS | | 0.9 | |
| 2-amino-4-diethylamino-6-thiocyanato-s-triazine | | | 0.9 |
| Sulfur | 1.5 | 1.5 | 1.5 |
| Scorch time $t_5$ in minutes (according to DIN 53524) at 130° C | 14 | 16 | 49 |
| Modulus 300% in kg./cm.$^2$ (according to DIN 53504) | 76 | 80 | 97 |
| Vulcanization time at 150° C., in minutes | 80 | 80 | 80 |

Also in polybutadiene rubber 2-amino-diethylamino-6-thiocyanato-s-triazine results in longer scorch time higher modulus values than MBT and MBTS.

EXAMPLE 5

| | Test recipes and results | | | |
|---|---|---|---|---|
| | 1 | 2 | 3 | |
| Composition: | | | | |
| Butadiene-acrylonitrile rubber (Perbunan N 3310) | 100 | 100 | 100 | 100 |
| Carbon black N 330 (Corax 3 of Degussa) | 50 | 50 | 50 | 50 |
| Stearic acid | 1 | 1 | 1 | 1 |
| Zinc oxide | 3 | 3 | 3 | 3 |
| Cumarone resin (melting point 55° C.) | 5 | 5 | 5 | 5 |
| MBT | 1.2 | | | |
| Dibutyl phthalate | 5 | 5 | 5 | 5 |
| MBTS | | 1.2 | | |
| CBS | | | 1.2 | |
| 2-amino-4-diethylamino-6-thiocyanato-s-triazine | | | | 1.2 |
| Sulfur | 2 | 2 | 2 | 2 |
| Scorch time $t_5$ in minutes (according to DIN 53524) at 120° C | 14 | 25 | 17 | 2 |
| Modulus 300% in kg./cm.$^2$ (according to DIN 53504) | 163 | 172 | 203 | 196 |
| Vulcanization time at 150° C. in minutes | 100 | 100 | 100 | 100 |

In acrylonitrile-butadiene it is especially difficult to produce mixtures with satisfactory processing safety since even CBS results in relatively short scorch times. Advantageously 2-amino-4-diethylamino-6-thiocyanato-s-triazine is added since it produces longer scorch times and a high level of modulus value, the latter especially in comparison to MBT and MBTS.

EXAMPLE 6

| | Test recipes and results | | |
|---|---|---|---|
| | 1 | 2 | 3 |
| Composition: | | | |
| Oil extended styrene-butediene rubber (Buna Huls 1712) | 96.5 | 96.5 | 96.5 |
| Polybutadiene rubber (Buna CB 10) | 30 | 30 | 30 |
| Carbon black N 330 (Corax 3 of Degussa) | 75 | 75 | 75 |
| Stearic acid | 1.2 | 1.2 | 1.2 |
| Zinc oxide | 4 | 4 | 4 |
| Aromatic plasticizer | 15 | 15 | 15 |
| N-phenyl-N'-isopropyl-p-phenylenediamine | 1.5 | 1.5 | 1.5 |
| Phenyl-β-naphthylamine | 1.5 | 1.5 | 1.5 |
| MBT | 1.2 | | |
| MBTS | | 1.2 | |
| 2-amino-4-diethylamino-6-thiocyanato-s-triazine | | | 1.2 |
| Sulfur | 1.6 | 1.6 | 1.6 |
| Scorch time $t_5$ in minutes (according to DIN 53524) at 130° C | 20 | 23 | 62 |
| Modulus 300% in kg./cm.$^2$ (according to DIN 53504) | 52 | 58 | 66 |
| Heat generation (measured with the Goodrich-Flexometer according to ASTM D 623-67, method A): | | | |
| ΔT in ° C. (measured at room temperature) | 106 | 102 | 98 |
| Compression set (measured at room temperature) in percent | 17 | 15 | 14 |
| Vulcanization time at 160° C. in minutes | 40 | 20 | 40 |

Also in this polymer blend used extensively for motor-car tire treads the processing safety of the thiocyanato triazine was proven and besides there was a noticeably higher crosslinking yield.

EXAMPLE 7

| | Test recipes and results | | |
|---|---|---|---|
| | 1 | 2 | 3 |
| Composition: | | | |
| Natural rubber (ribbed smoked sheets I) | 50 | 50 | 50 |
| Styrene-butadiene rubber (Buna Huls 1500) | 50 | 50 | 50 |
| Carbon black N 330 (Corax 3 of Degussa) | 45 | 45 | 45 |
| Stearic acid | 2 | 2 | 2 |
| Zinc oxide | 5 | 5 | 5 |
| Aromatic plasticizer | 5 | 5 | 5 |
| Phenyl-β-naphthylamine | 1 | 1 | 1 |
| Phenyl-α-naphthylamine | 0.5 | 0.5 | 0.5 |
| N-phenyl-N'-isopropyl-p-phenylenediamine | 0.8 | 0.8 | 0.8 |
| MBT | 0.85 | | |
| MBTS | | 0.85 | |
| 2-amino-4-diethylamino-6-thiocyanato-s-triazine | | | 0.85 |
| Sulfur | 2.25 | 2.25 | 2.25 |
| Scorch time $t_5$ in minutes (according to DIN 53524) at 130° C | 12 | 16 | 18 |
| Modulus 300% in kg./cm.$^2$ (according to DIN 53504) | 103 | 104 | 122 |
| Vulcanization time at 150° C. in minutes | 60 | 40 | 60 |

The polymer blend chosen in Example 7 is regarded as typical for a truck tire tread. The advantage of the thiocyanatotriazine compound is present here also in the processing safety (long scorch time) and the high cross-linking yield (high modulus value).

Following Examples 8–11 were carried out with bis-thiocyanato triazines.

EXAMPLE 8

| | Test recipes and results | | | | |
|---|---|---|---|---|---|
| | 1 | 2 | 3 | 4 | 5 |
| Composition: | | | | | |
| Styrene-butadiene rubber (Buna Huls 1500) | 100 | 100 | 100 | 100 | 100 |
| Carbon black N 330 (Corax 3 of Degussa) | 50 | 50 | 50 | 50 | 50 |
| Stearic acid | 2 | 2 | 2 | 2 | 2 |
| Zinc oxide | 3 | 3 | 3 | 3 | 3 |
| MBT | 1 | | | | |
| MBTS | | 1 | | | |
| 2-diethylamino-4,6-bis-thiocyanato-s-triazine | | | 1 | | |
| 2-i-propylamino-4,6-bis-thiocyanato-s-triazine | | | | 1 | |
| 2-t-butylamino-4,6-bis-thiocyanato-s-triazine | | | | | 1 |
| Sulfur | 2 | 2 | 2 | 2 | 2 |
| Scorch time $t_5$ in minutes (according to DIN 53524) at 130° C | 14 | 18 | 24 | 28 | 24 |
| Modulus 300% in kg./cm.$^2$ (according to DIN 53504) | 167 | 173 | 229 | 272 | 189 |
| Vulcanization time at 160° C. in minutes | 100 | 100 | 100 | 100 | 100 |

High processing safety on the basis of longer scorch times and high cross linking yields also are shown with the bis-thiocyanato-s-triazines.

EXAMPLE 9

| | T est recipes and results | | | |
|---|---|---|---|---|
| | 1 | 2 | 3 | 4 |
| Composition: | | | | |
| Polybutadiene rubber (Buna CB 10) | 100 | 100 | 100 | 100 |
| Carbon black N 330 (Corax 3 of Degussa) | 50 | 50 | 50 | 50 |
| Stearic acid | 2 | 2 | 2 | 2 |
| Zinc oxide | 3 | 3 | 3 | 3 |
| MBT | 0.9 | | | |
| MBTS | | 0.9 | | |
| CBS | | | 0.9 | |
| 2-diethylamino-4,6-bis-thiocyanato-s-triazine | | | | 0.9 |
| Sulfur | 1.5 | 1.5 | 1.5 | 1.5 |
| Scorch time $t_5$ in minutes (according to DIN 53524) at 130° C | 14 | 16 | 19 | 50 |
| Modulus 300% in kg./cm.$^2$ (according to DIN 53504) | 76 | 80 | 111 | 109 |
| Vulcanization time at 150° C. in minutes | 80 | 80 | 40 | 80 |

2-diethylamine-4,6-thiocyanato-triazines imparts to polybutadiene rubber advantages similar to those of 2-amino-4-diethylamino-6-thiocyanato-triazine (Example 4). However, it results in a somewhat higher cross linking yield than that of mono-thiocyanato-triazine.

EXAMPLE 10

| | Test recipes and results | | | |
|---|---|---|---|---|
| | 1 | 2 | 3 | 4 |
| Composition: | | | | |
| Butadiene-acrylonitrile rubber (Perbunan N 3310) | 100 | 100 | 100 | 100 |
| Carbon black N 330 (Corax 3 of Degussa) | 50 | 50 | 50 | 50 |
| Stearic acid | 1 | 1 | 1 | 1 |
| Zinc oxide | 3 | 3 | 3 | 3 |
| MBT | 1.2 | | | |
| MBTS | | 1.2 | | |
| CBS | | | 1.2 | |
| 2-diethylamino-4,6-bisthiocyanato-s-triazine | | | | 1.2 |
| Cumarone resin (melting point 55° C.) | 5 | 5 | 5 | 5 |
| Dibutyl phthalate | 5 | 5 | 5 | 5 |
| Sulfur | 2 | 2 | 2 | 2 |
| Scorch time $t_5$ in minutes (according to DIN 53524) at 120° C | 14 | 25 | 17 | 31 |
| Modulus 300% in kg./cm$^2$ (according to DIN 53504) | 163 | 172 | 203 | 239 |
| Vulcanization time at 150° C. in minutes | 100 | 100 | 100 | 100 |

2-diethylamino-4,6-bis-thiocyanato-s-triazine produces in acrylonitrile-butadiene rubber the same advantages in scorch behavior as 2-amino-4-diethylamino-6-thiocyanato-s-triazine but results in substantially higher cross linking yields measured by the high modulus value.

EXAMPLE 11

| | Test recipes and results | | |
|---|---|---|---|
| | 1 | 2 | 3 |
| Composition: | | | |
| Oil extended styrene-butadiene rubber (Buna Huls 1712) | 96.5 | 96.5 | 96.5 |
| Polybutadiene rubber (Buna CB 10) | 30 | 30 | 30 |
| Carbon black N 330 (Corax 3 of Degussa) | 75 | 75 | 75 |
| Stearic acid | 1.2 | 1.2 | 1.2 |
| Zinc oxide | 4 | 4 | 4 |
| MBT | 1.2 | | |
| MBTS | | 1.2 | |
| 2-diethylamino-4,6-bisthiocyanato-triazine | | | 1.2 |
| Aromatic plasticizer | 15 | 15 | 15 |
| Phenyl-β-naphthylamine | 1.5 | 1.5 | 1.5 |
| N-phenyl-N'-isopropyl-p-phenylene-diamine | 1.5 | 1.5 | 1.5 |
| Sulfur | 1.6 | 1.6 | 1.6 |
| Scorch time $t_5$ in minutes (according to DIN 53524) at 130° C | 20 | 23 | 25 |
| Modulus 300% in kg./cm.$^2$ (according to DIN 53504) | 52 | 58 | 106 |
| Heat generation (measured with the Goodrich-Flexometer according to ASTM D 623-67, method A): | | | |
| ΔT in ° C. (measured at room temperature) | 106 | 102 | 81 |
| Compression set (measured at room temperature) in percent | 17 | 15 | 5 |
| Vulcanization time at 160° C. in minutes | 40 | 20 | 80 |

The above cited test results in Example 11 are comparable with those in Example 7, only the bis-thiocyanato-triazine imparts substantially more favorable data for the modulus value, heat generation and compression set.

EXAMPLES 12 TO 14

(A) Production of monothiocyanates of s-triazine 12. 5.4 g. of diamino-mercaptotriazine are dissolved in 100 ml. of a 1.6% (per wetight) solution of sodium hydroxide in water. After filtering and cooling to 0° C. there are added to the solution at once 3.0 ml. of cyanogen chloride. The temperature rises to 10° C. and a thick white precipitate is formed. After 30 minutes the precipitate is filtered off, washed and vacuum-dried at 40° C.

The analysis of this substance melting above 350° C. shows that it is diamino-monothiocyanotriazine obtained with a 96.1% yield (6.1 g.).

13. 15 g. of 2-dimethylamino-4-isobutylamino-6-mercapto-s-triazine are suspended in 100 ml. of acetone. While stirring there are added 6 g. of cyanogen chloride at 20° C. The temperature then rises to 28° C. After ten minutes the mixture is diluted with cold water and neutralized with sodium bicarbonate. An oil is formed which crystallizes soon. 12.25 grams of 2-dimethylamino-4-isobutylamino-6-thiocyano-s-triazine melting at 108° C. are obtained.

(B) Production of dithiocyanates of s-triazine 14. 913 grams of 2-diethylamino-4,6-dimercapto-s-triazine are added to a solution of 339 grams of sodium hydroxide in 5 liters of water.

Now 5 liters of water are separately cooled down to 0° C. and 624 grams (equal to 512 ml.) of cyanogen chloride are added thereto. While stirring the solution of the triazine compound is poured into it. The temperature rises to 5° C. and a yellow precipitate is formed. After filtering, washing and drying 1119 grams of 2-diethylamino-4,6-dithiocyanato-s-triazine are obtained, having a melting point of 114–115° C., which represents a yield of 99.3% of the theoretical value.

What is claimed is:

1. A vulcanizable composition comprising (1) at least one rubber selected from the group consisting of natural rubber and synthetic rubber which is a polymer of a halogen free diene, (2) 10 to about 200 parts per 100 parts of rubber of at least one filler, (3) at least one compound selected from the group consisting of sulfur, sulfur containing and sulfur liberating vulcanizing agent and (4) 0.1 to 5 parts per 100 parts of rubber of at least one compound having the formula (I)

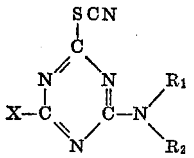

wherein $R_1$ and $R_2$ are hydrogen, alkyl of 1 to 18 carbon atoms, hydroxy alkyl of 1 to 18 carbon atoms and of 1 to 3 hydroxyl groups, aralkyl of 6 carbon atoms in the ring and 1 to 6 carbon atoms in the alkylene group, phenyl substituted with 0 to 3 alkyl groups each having 1 to 6 carbon atoms, cycloalkyl having 5 to 7 carbon atoms in the ring and 0 to 3 alkyl side chains each having 1 to 6 carbon atoms or wherein $R_1$, $R_2$ and N altogether form a heterocyclic ring having 5 to 7 ring atoms with 3 to 6 carbon atoms and 0 to 1 oxygen atom and X is —SCN or

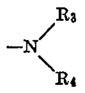

wherein $R_3$ and $R_4$ are defined likewise as $R_1$ and $R_2$.

2. A vulcanizable composition according to claim 1 wherein (1) is at least one rubber selected from the group consisting of natural rubber, butadiene-styrene copolymer, butadiene-acrylonitrile copolymer, polybutadiene, polyisoprene and ethylene-propylene-diene terpolymer.

3. A vulcanizable composition according to claim 2 wherein $R_1$, $R_2$, $R_3$ and $R_4$ are hydrogen, alkyl of 1 to 18 carbon atoms, hydroxyalkyl of 2 to 3 carbon atoms, benzyl, phenyl or cyclohexyl.

4. A vulcanizable composition according to claim 2 wherein X is

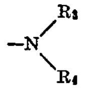

5. A vulcanizable composition according to claim 4 wherein $R_1$ is hydrogen, $R_2$ is hydrogen or alkyl of 1 to 4 carbon atoms, $R_3$ is hydrogen or alkyl of 1 to 4 carbon atoms and $R_4$ is alkyl of 1 to 2 carbon atoms.

6. A vulcanizable composition according to claim 2 wherein X is —SCN, $R_1$ is hydrogen or alkyl of 1 to 4 carbon atoms and $R_2$ is alkyl of 1 to 18 carbon atoms, phenyl or cyclohexyl.

7. A vulcanizable composition according to claim 6 wherein $R_1$ is hydrogen or alkyl of 1 to 4 carbon atoms and $R_2$ is alkyl of 1 to 4 carbon atoms.

8. A vulcanizable composition according to claim 1 wherein (2) is carbon black or silica.

9. A vulcanizable composition comprising (1) a rubber which is natural rubber or a synthetic rubber which is a polymer of a halogen free diene, (2) 10 to about 200 parts of a rubber filler per 100 parts of rubber selected from the group consisting of carbon black, silica, silicate and calcium carbonate, (3) 0.1 to 5 parts per 100 parts of the rubber of at least one compound of Formula I according to claim 1 and (4) sulfur or a sulfur donor.

10. A composition according to claim 9 wherein the filler is carbon black or silica.

References Cited

UNITED STATES PATENTS

| | | | |
|---|---|---|---|
| 3,290,165 | 12/1966 | Iannicelli | 260—41.5 R |
| 2,650,220 | 8/1953 | Roemer et al. | 260—249.5 |
| 2,996,505 | 8/1961 | Schwarze | 260—249.5 |
| 3,137,695 | 6/1964 | Schwarze | 260—249.8 |

MORRIS LIEBMAN, Primary Examiner
H. H. FLETCHER, Assistant Examiner

U.S. Cl. X.R.

260—249.5, 249.8, 762, 42.36, 763, 42.37, 765, 42.38, 791